(Model.)

M. W. POWELL.
FIRE AND WATER PROOF ROOF.

No. 318,023. Patented May 19, 1885.

Witnesses:
Albert H. Adams.
Willard G. Anthony

Inventor:
Moses W. Powell

UNITED STATES PATENT OFFICE.

MOSES W. POWELL, OF CHICAGO, ILLINOIS.

FIRE AND WATER PROOF ROOF.

SPECIFICATION forming part of Letters Patent No. 318,023, dated May 19, 1885.

Application filed January 27, 1885. (Model.)

*To all whom it may concern:*

Be it known that I, MOSES W. POWELL, residing at Chicago, in the county of Cook and State of Illinois, and a citizen of the United States, have invented a new and useful Improvement in Roofs, of which the following is a full description, reference being had to the accompanying drawings, in which—

Figure 1:
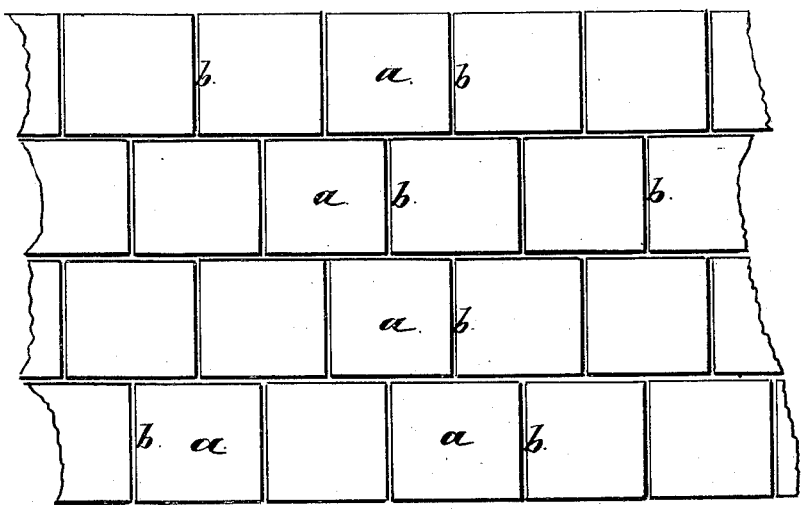
Figure 2:
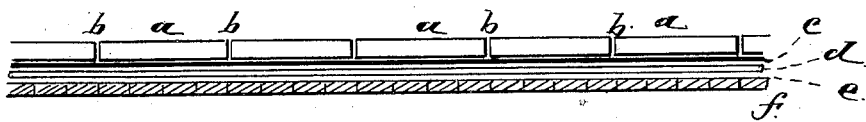

Figure 1 is top or plan view of a section of the roof; Fig. 2, a vertical section of the same with the courses separated.

The object of this invention is to construct a fire and water proof roof which will be comparatively light, efficient, and durable; and its nature consists in the improvements hereinafter described and claimed as new.

In the drawings, $a$ indicates the tile; $b$, the joints between the tile; $c$, the coating of actinolite cement; $d$, saturated roofing-felt; $e$, dry roofing-felt, and $f$ roof boards or foundation.

The foundation $f$ of the roof may be made of roof-boards in the ordinary manner, or in any other suitable well-known manner, properly supported upon and by the building. On this foundation I lay one or more thicknesses of dry roofing-felt, $e$. Over this two or more thicknesses of saturated roofing-felt $d$—such as is ordinarily used—and cement them together by any of the ordinary roofing-cements, compositions, or by asphalt. Over this I spread a coating of fibrous actinolite cement, $c$, which is about one-quarter of an inch in thickness, (more or less,) and while this coating is in a plastic condition I lay thereon, preferably, a thin glazed tile, and firmly bed them therein, leaving spaces between the tile of about half an inch, or of a width to give the cement filling a sufficient body to maintain its position and integrity, which spaces are filled in with a cement composed of asphalt and marble-dust, sometimes known as "marmolite" cement, which shortly attains the appearance and nearly the hardness of marble, thus making a continuous fire-proof surface for the roof, which will not warp or crack, as the tile and marmolite cement do not expand or contract under the influence of heat, cold, or moisture. The actinolite cement is made of a fibrous mineral, which is in the nature of asbestus, or an inferior quality of that mineral mixed with sufficient coal-tar, asphalt, and resin to render it plastic when first formed, but which hardens adhesively to the tile and to the roofing-felt, so as to hold the roofing material firmly together, and it, with the roofing-felt, furnishes a water-proof material which will prevent leakage, even if the tile should crack or open at the joints. By this construction I form a compact, comparatively light, cheap, and durable fire and water proof roofing, and in its best form the upper surface is composed of glazed tile; but I do not limit myself to their use, as a good roof can be made of the same combination and arrangement of the other material with brick, prepared sections of thin stone, or thick slate for the upper course or covering.

What I claim as new, and desire to secure by Letters Patent, is as follows:

The herein-described roof, composed of one or more layers of dry felt, two or more of saturated felt cemented together, a layer or coating of actinolite cement, and a covering of tile or its equivalent laid with spaces filled with marmolite cement, substantially as specified.

MOSES W. POWELL.

Witnesses:
   ALBERT H. ADAMS,
   WILLARD G. ANTHONY.